United States Patent
Knoplioch et al.

(10) Patent No.: US 6,643,533 B2
(45) Date of Patent: Nov. 4, 2003

(54) METHOD AND APPARATUS FOR DISPLAYING IMAGES OF TUBULAR STRUCTURES

(75) Inventors: Jerome F. Knoplioch, Neuilly sur Seine (FR); Fabienne A. Betting, Paris (FR); Gilles R. R. Moris, Boulogne Billancourt (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 91 days.

(21) Appl. No.: 09/976,120

(22) Filed: Oct. 12, 2001

(65) Prior Publication Data

US 2002/0118869 A1 Aug. 29, 2002

Related U.S. Application Data

(60) Provisional application No. 60/253,541, filed on Nov. 28, 2000.

(51) Int. Cl.$^7$ .................................................. A61B 5/05
(52) U.S. Cl. ...................... 600/407; 600/410; 600/425; 600/920; 382/128; 382/131; 378/4; 434/267
(58) Field of Search .................................. 600/407, 410, 600/425, 463, 466, 467, 160, 109, 920; 382/128, 131, 173; 378/4, 8, 19, 901; 434/262, 267, 272; 345/685; 128/916; 73/622, 633

(56) References Cited

U.S. PATENT DOCUMENTS

| 5,495,852 | A | * | 3/1996 | Stadler et al. | 600/443 |
|---|---|---|---|---|---|
| 5,891,030 | A | * | 4/1999 | Johnson et al. | 600/407 |
| 6,151,404 | A | | 11/2000 | Pieper | |
| 6,331,116 | B1 | * | 12/2001 | Kaufman et al. | 434/262 |
| 6,456,735 | B1 | * | 9/2002 | Sato et al. | 382/131 |

\* cited by examiner

*Primary Examiner*—Marvin M. Lateef
*Assistant Examiner*—Barry Pass
(74) *Attorney, Agent, or Firm*—Quarles & Brady LLP (57) ABSTRACT

A method and an apparatus for displaying a structure of a vessel are disclosed. In one embodiment, the method includes identifying a centerline of the vessel within a portion of the vessel that includes the structure, identifying a contour of the vessel within a cross-sectional plane that is normal to a selected point along the centerline, measuring lengths of a plurality of segments that pass across the contour through the selected point, selecting one of the plurality of segments, and displaying an imaging plane defined by the selected one segment and an axis that is tangent to the centerline at the point. In another embodiment, the method includes determining a centerline of a tubular structure, selecting a section of the centerline, determining a plane that minimizes the distance to the selected section, and displaying the plane.

19 Claims, 10 Drawing Sheets

METHOD AND APPARATUS FOR DISPLAYING IMAGES OF TUBULAR STRUCTURES

CROSS REFERENCE TO RELATED APPLICATIONS

This application claims the benefit of U.S. provisional application No. 60/253,541 filed on Nov. 28, 2000 entitled Method and Apparatus For Displaying Images of Tubular Structures.

BACKGROUND OF THE INVENTION

This invention relates generally to methods and apparatuses for the analysis of vessel images, and more particularly to methods and apparatus for assisting medical care personnel such as radiologists in preparing measurements and reports for surgical planning from images derived from computed tomographic, MR, and 3D radiation imaging.

In at least some computed tomography (CT) imaging system configurations, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. X-ray sources typically include x-ray tubes, which emit the x-ray beam at a focal spot. X-ray detectors typically include a collimator for collimating x-ray beams received at the detector, a scintillator adjacent the collimator, and photodetectors adjacent the scintillator.

An important application of computed tomographic (CT) imaging systems, as well as magnetic resonance (MR) imaging and 3-D x-ray (XR) imaging systems, is to produce 3D image data sets for vascular analysis, which can include analysis of a variety of tortuous tubular structures such as airways, ducts, nerves, blood vessels, etc. Production of such 3D image data sets is particularly important for radiologists, who are called upon to provide thorough visual reports to allow assessments of stenosis or aneurysm parameters, quantify lengths, section sizes, angles, and related parameters. Information concerning, for example, the most acute stenosis on a selected vessel section, the largest aneurysm on a selected vessel section, or the tortuosity of a vessel, is commonly utilized by physicians to allow for surgical planning. For productivity reasons, as well as to reduce film costs, the 3D image data sets should be limited to only a small set of significant images.

To facilitate the obtaining of useful information for vascular analysis in an efficient manner, conventional medical imaging systems sometimes provide 3D visualization software. Such software is provided either on the imaging systems themselves or on analysis workstations, and provides a set of tools to perform length, angle or volume measurements and to visualize a volume in different ways, for example, using cross-sections, navigator or volume rendering. With respect to vascular analysis, in particular, the software can be used to obtain multiple oblique slices of a particular vessel to allow for analysis of the vessel.

However, use of such conventional software and related tools is highly operator dependent, and requires both time and software expertise. Selecting the best images to depict anatomical features or lesions particularly is a time-consuming and operator-dependent task, since one needs to adjust 5 independent parameters to select a plane and it often is difficult to adjust the view since the objects of interest usually are not entirely visible. For example, a trained operator may need more than one hour to complete a single abdominal aorta aneurysm case. Even with trained operators given all the required time, results are not particularly reproducible and there are no consistent reporting frameworks. Further, some measurements, such as true 3D-length measurement along vessels, cannot be performed using known manual tools. Because of these limitations, only a small number of sites are able to provide high-quality reports.

Therefore, it would be advantageous if new methods and apparatuses were developed for allowing medical imaging systems and related 3D visualization software to produce useful 3D imaging data sets in a more efficient, consistent, repeatable, rapid, and less operator-dependent manner. It would particularly be advantageous if such new methods and apparatuses facilitated vascular analysis, including the analysis and imaging of tubular vessels and related stenoses, aneurysms, and tortuosity. It further would be advantageous if such methods and apparatuses could be employed both during imaging and in post-processing after imaging is completed.

BRIEF SUMMARY OF THE INVENTION

The present invention is a set of methods and apparatuses that automatically determine the best slice plane settings for vascular images in a consistent manner by defining the planes of interest in relation to points along a centerline. By determining the best slice plane settings in this manner, images of stenoses, aneurysms and tortuous features can be consistently and repeatably obtained. These methods and apparatuses can be used to produce images on a post-processing system or to select an orientation and location during operation of an imaging system. Further, all the methods may be used in a "batch" mode where selected points or sections are sampled repeatably at some interval along the centerline of the structure of interest to produce a complete set of images that depict the complete structure.

In particular, the present invention relates to a method of displaying a structure of a vessel. The method includes identifying a centerline of the vessel within at least a portion of the vessel that includes the structure, identifying a contour of the vessel within a cross-sectional plane that is normal to a selected point along the centerline, measuring lengths of a plurality of segments that pass across the contour through the selected point, and selecting one of the plurality of segments. The method further includes at least one of displaying at least a part of an imaging plane defined by the selected one segment and an axis that is tangent to the centerline at the point, where the imaging plane shows the structure of the vessel, and performing an image acquisition in relation to the imaging plane.

The present invention further relates to an apparatus for displaying a portion of a tubular vessel. The apparatus includes means for selecting at least one point along a centerline of the vessel proximate the portion, means for identifying an imaging plane based upon the selected at least one point, and at least one of means for displaying at least a part of the imaging plane, and means for acquiring an image in relation to the imaging plane.

The present invention additionally relates to a method of displaying a structure of a vessel. The method includes determining a centerline of a tubular structure, selecting a section of the centerline, and determining a plane that minimizes the distance to the selected section. The method further includes at least one of displaying at least a part of the plane, and performing an image acquisition in relation to the plane.

DETAILED DESCRIPTION OF THE INVENTION

Figure 1:
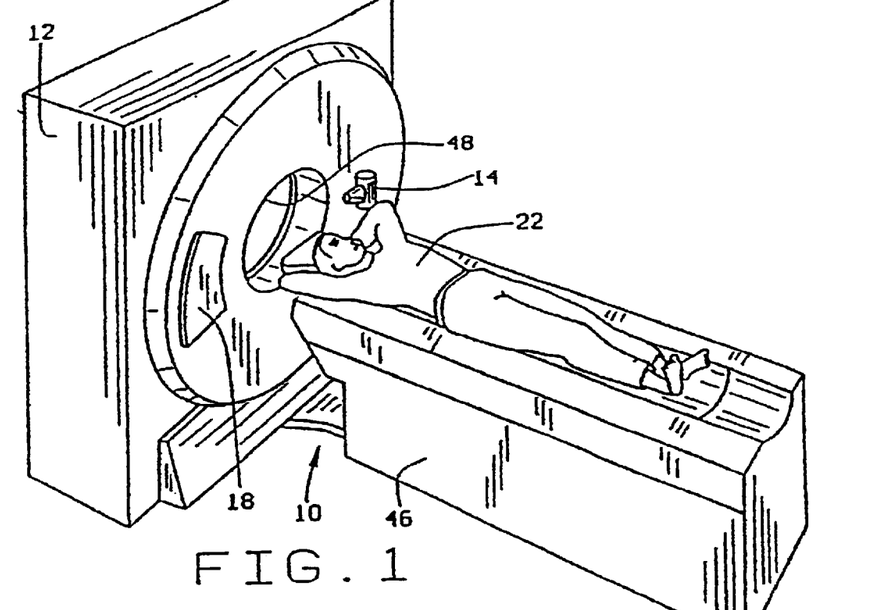
FIG. 1 is a pictorial view of a CT imaging system.
Figure 2:
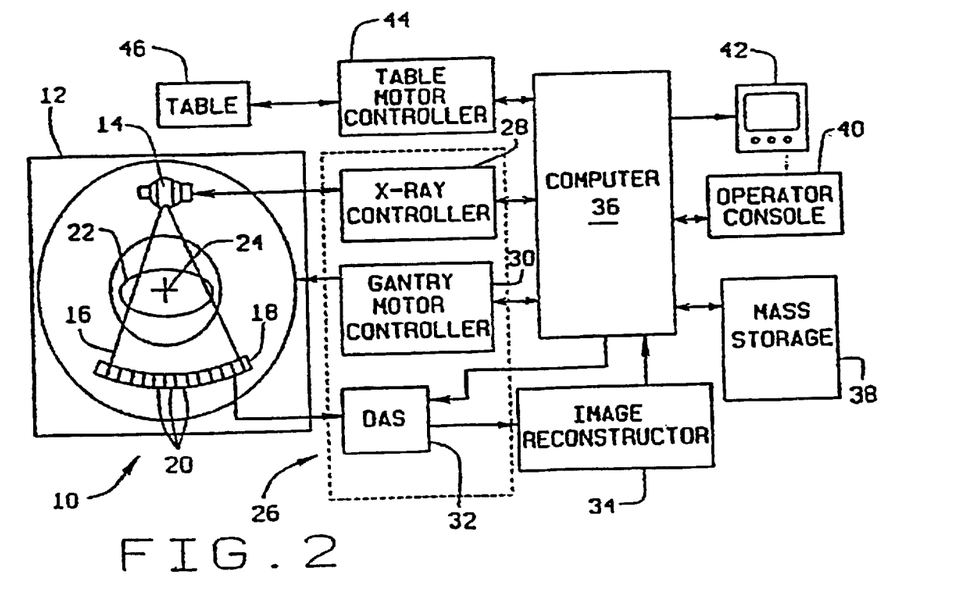
FIG. 2 is a block schematic diagram of the system illustrated in FIG. 1.

In one embodiment of the present invention, computed tomographic images are used. Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object, such as a medical patient 22. Each detector element 20 produces an electrical signal that represents the intensity of an impinging x-ray beam and hence the attenuation of the beam as it passes through object or patient 22. During a scan to acquire x-ray projection data, gantry 12 and the components mounted thereon rotate about a center of rotation 24. In one embodiment, and as shown in FIG. 2, detector elements 20 are arranged in one row so that projection data corresponding to a single image slice is acquired during a scan. In another embodiment, detector elements 20 are arranged in a plurality of parallel rows, so that projection data corresponding to a plurality of parallel slices can be acquired simultaneously during a scan.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
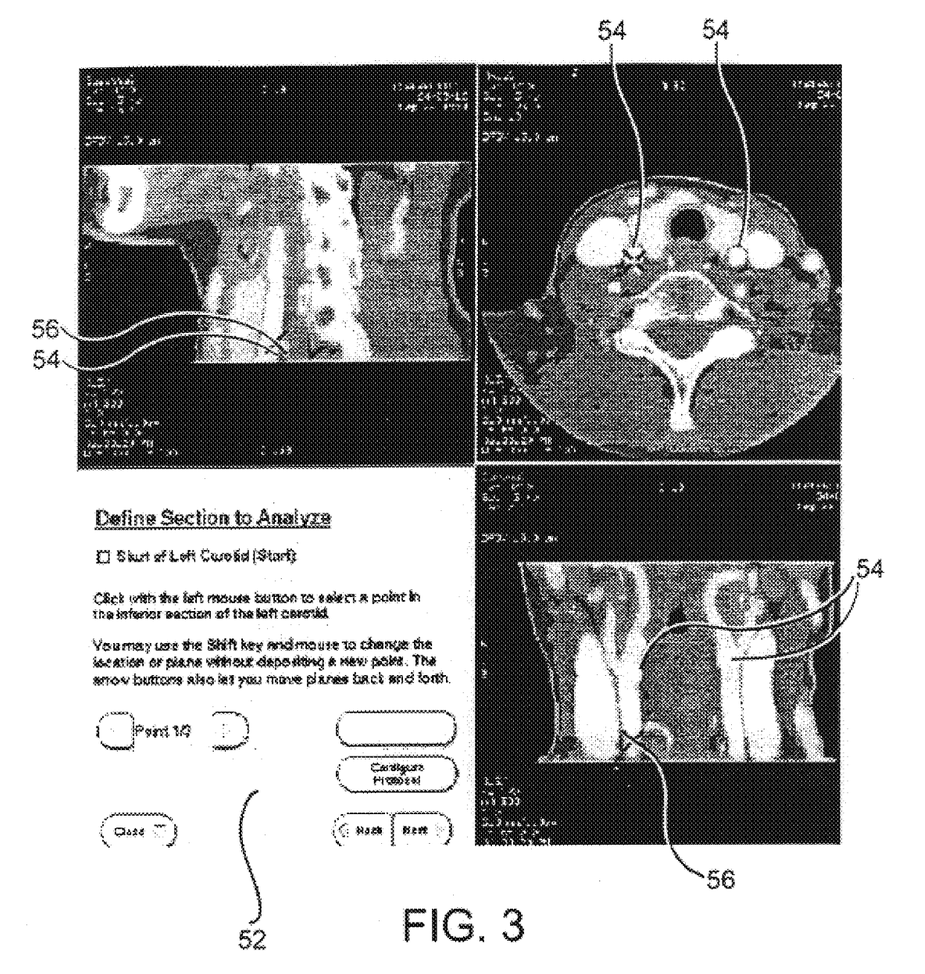
FIG. 3 is a drawing of a computer display of one embodiment of the present invention for the selection of vascular sections to be analyzed.

Computer 36, console 40, and display 42 are used in the following steps, in conjunction with a pointing device. The pointing device is, for example, a control on console 40 or a separate device such as a mouse (not shown). In one embodiment and referring to FIG. 3, software executed by computer 36 displays a wizard panel 52 that prompts a user to select locations in a tube-shaped tree, for example, a vascular tree 54, and the user is directed to point 56 to a section of tree 54. This section or region of interest may span across several branches, but the section should be connected. The user then clicks to select either a reformatted slice or a 3D view.

Figure 4:
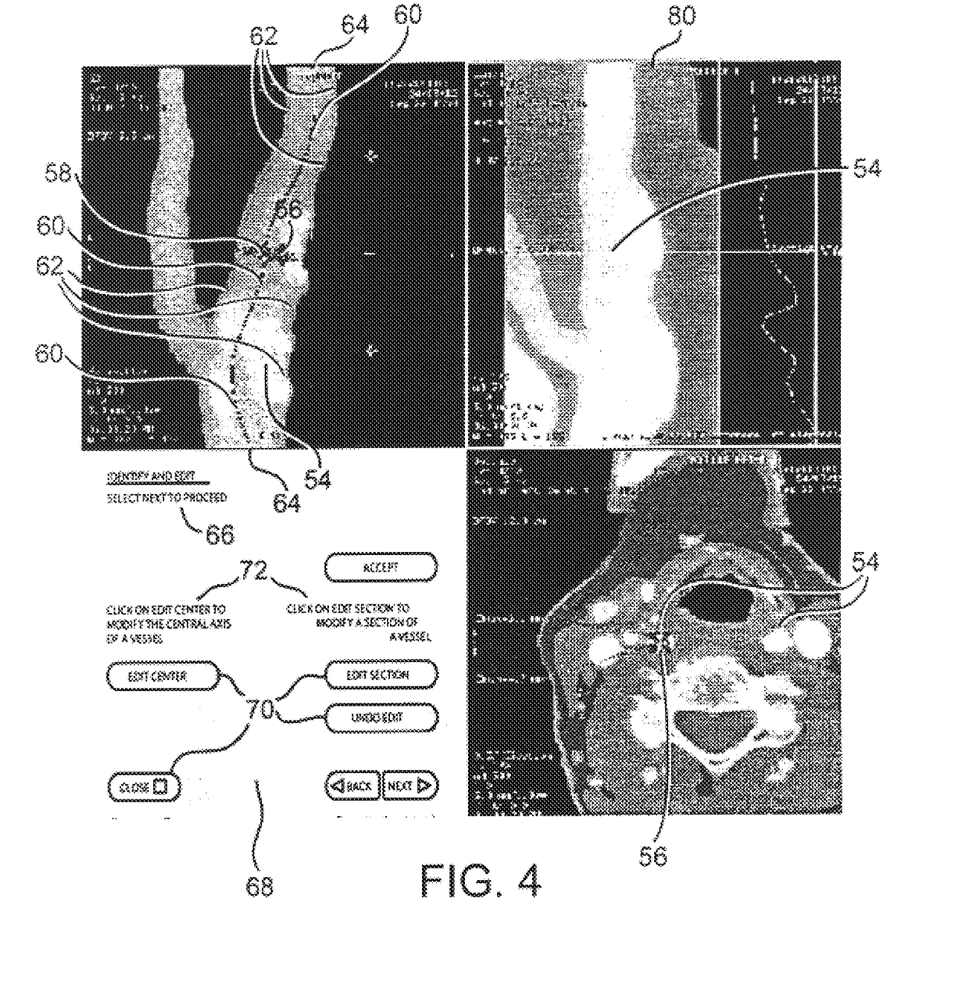
FIG. 4 is a drawing of a computer display showing automated computation of a centerline for vascular sections of interest.

Referring to FIG. 4, the software program then locates a center point 58 that is closest to a location 56 pointed to by the user. To compute the center point, a local axis 60 of a selected vessel is computed. In a plane perpendicular to axis 60, the software computes an "average" (i.e., a geometric center) of contour points 62 found around selected point 56. (Contour points 62 are boundary points of vessels 64 or other structures found by computer 36 using contrasts, thresholding, or any other suitable method.) The software then prompts 66 the user for the next point of interest. This process is repeated until the locations of a set of points 56 defined by a given type of anatomy have been indicated by the user. The set of points 56 forms a polygon that approximates the actual centerline.

In one embodiment, although the software is programmed with a number of points 56 to be selected for various given types of anatomy, the software provides the user with the option to skip points 56 not relevant for his or her specific needs. In this manner, the user selects a series of points of interest along a centerline of branches that have been identified. Wizard panel 52, in one embodiment, also provides tools (not shown in FIG. 4) to customize the number and/or names of the sections to be designated to permit the software to be tailored to site preferences or anatomical situations.

Next, the software computes a centerline 60 for the vascular sections of interest from the set of points 56 defined during the previous step. A dynamic programming algorithm is used to compute an initial path (not shown) that minimizes a cost function, for example, one that avoids low gray-level values of the image. Next, the software determines planes perpendicular to this path, and on each plane, the software computes a new center point 58 from contour points 62. A similar process is described by U.S. Pat. No. 6,151,404, which is hereby incorporated by reference herein. Vessels 64 are unfolded 80 along centerline 60 defined by new center points 58, and along each branch, the software computes the section area and maximum and minimum diameters for the section. After computation, the software permits the user to edit centerline 60 and the section area for each branch if the results are not deemed correct. A wizard panel 68 provides tools 70 and guidance 72 to perform these actions.

Figure 5:
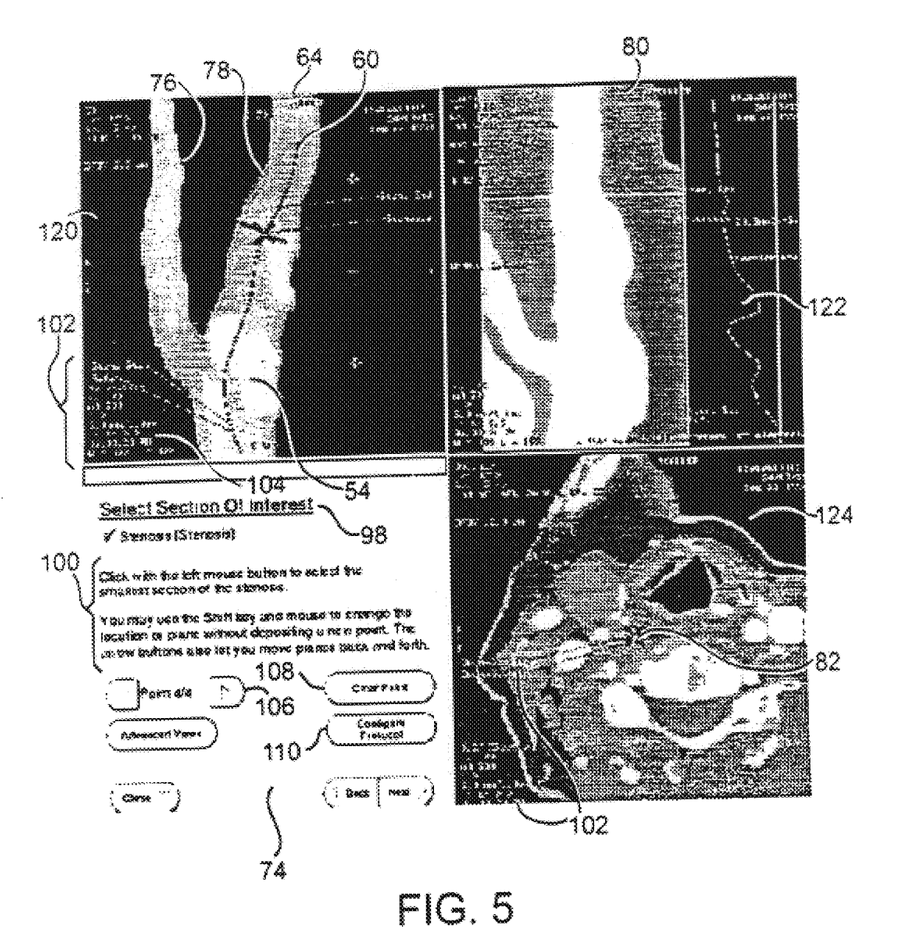
FIG. 5 is a drawing of a computer display for the selection of sections of interest for measurements and reports.

Referring to FIG. 5, one or more views 120, 122, 124 also can be displayed. In one embodiment, the view or views 120, 122 and 124 displayed is/are a curved view, as a function of the selected branch, reformatted views or 3D views generated as a function of the centerline that has been identified and a location along the centerline, and a selected branch (if there is more than one branch); or a reformatted views or 3D views generated as a function of the identified centerline, a location along the centerline and a selected geometric property of the cross-section boundary of the tube-shaped tree at selected location, as well as the selected branch (if there is more than one).

Also in one embodiment, the view or views displayed is/are segmented 3D views, where the section of interest has been identified and a remainder of the patient's anatomy is not visible or attenuated; curved views, as a function of selected branch (if there is more than one); reformatted views or 3D views generated as a function of the centerline that has been identified and a location along the centerline, as well as the selected branch (if there is more than one); reformatted views or 3D views generated as a function of the identified centerline, a location along the centerline and a selected geometric property of the cross-section boundary of the tube-shaped tree at selected location, as well as the selected branch (if there is more than one).

Figure 6:
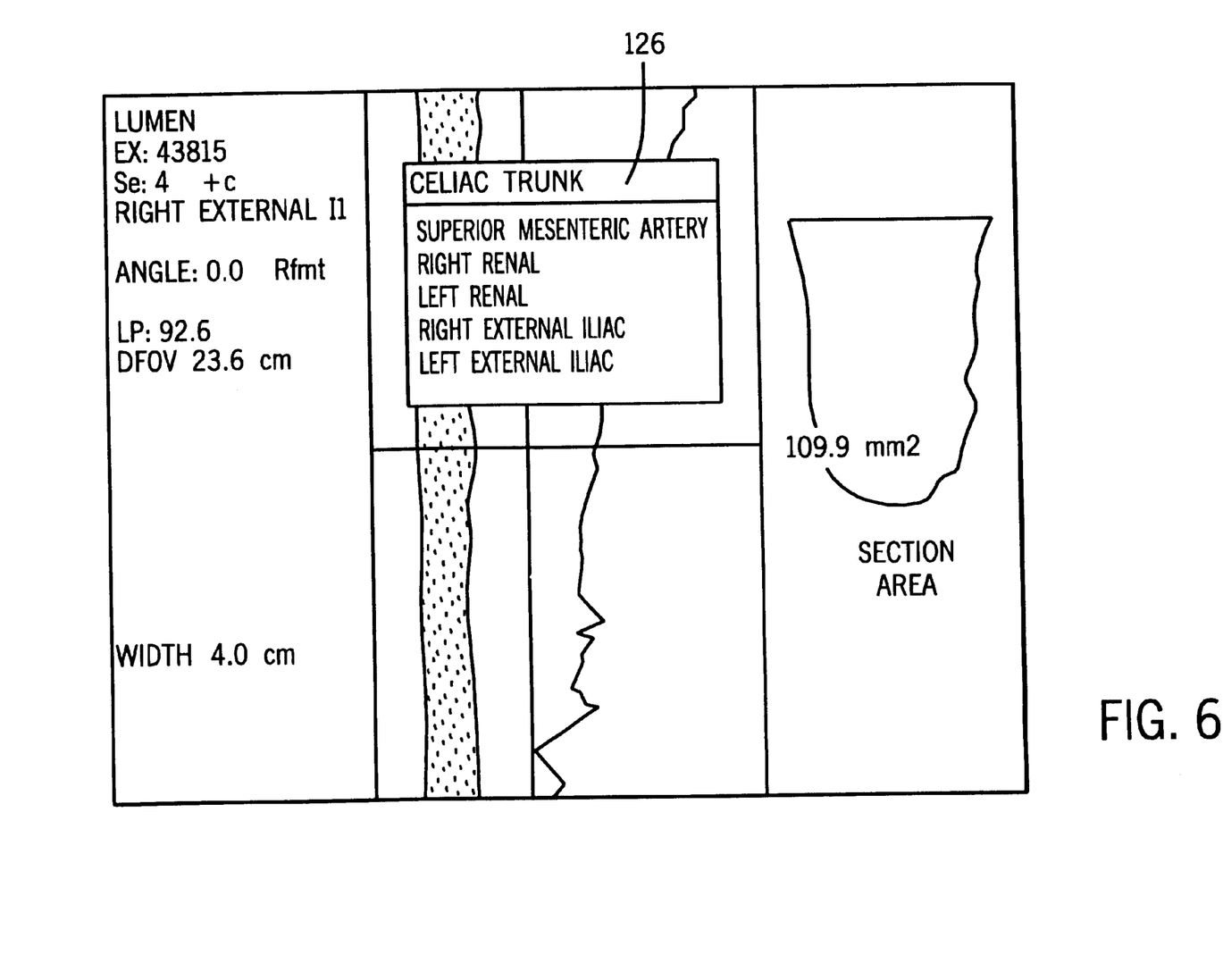
FIG. 6 is a drawing of a computer display showing a branch selection menu.

A user is also able to rotate the view around the unfolded selected branch 80 and, by moving the cursor mouse 82, obtain a cross section of a vessel at the cursor position on another view. Referring to FIG. 6, a menu 126 is available to assist the user in selecting any branch 76, 78 of vascular tree 54 of interest.

Figure 7:
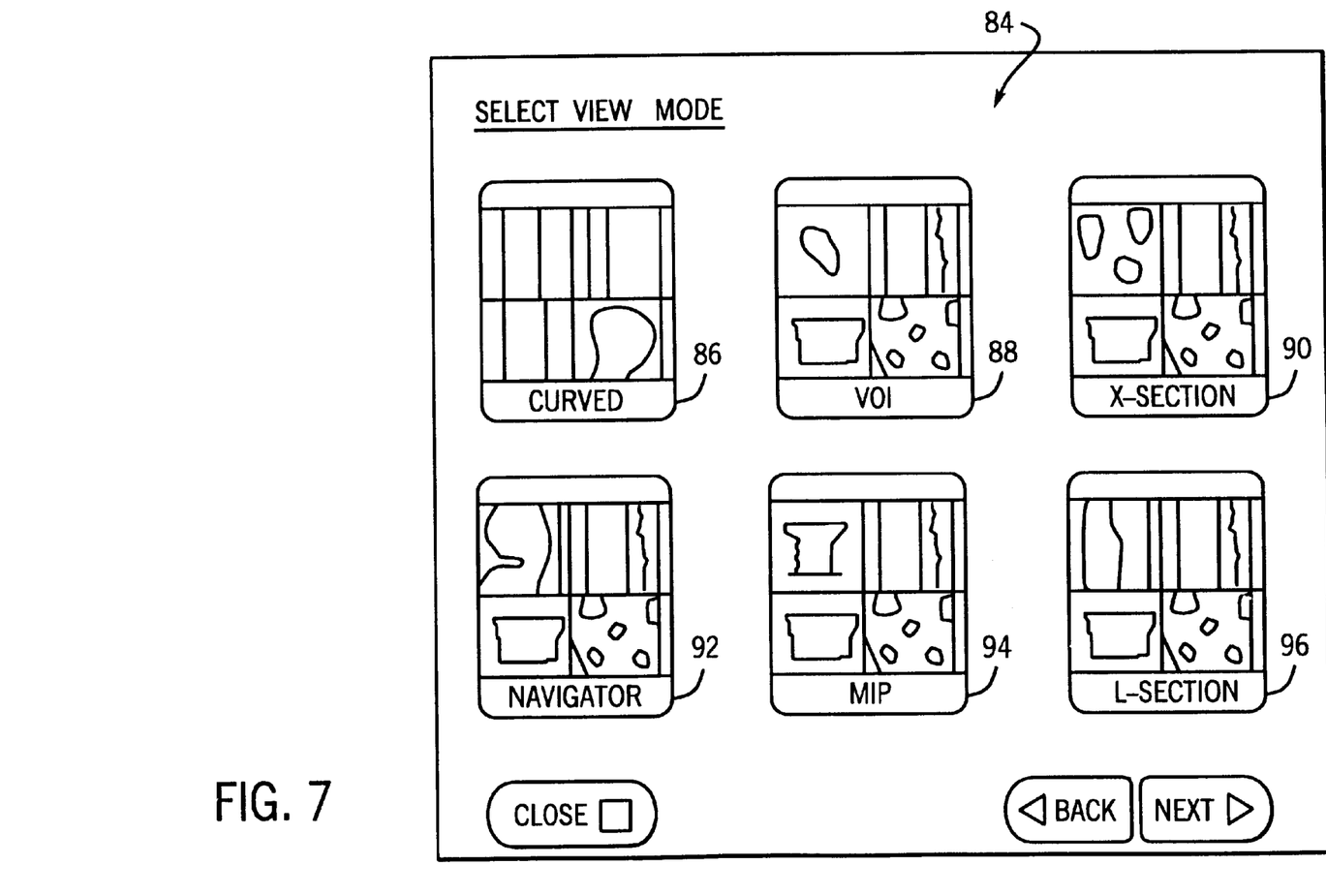
FIG. 7 is a drawing of a computer display showing a palette of advanced display tools.

In one embodiment and referring to FIG. 7, the software next provides a palette 84 of advanced display tools 86, 88, 90, 92, 94, and 96. In one embodiment, these include tools for curved views, with rotation controls; 3D views with automatic segmentation of the region of interest; endovascular 3D views; and automatic adjustment of reformatted slices to display cross-sections, longitudinal sections or specific views to capture the local smallest or largest vascular section.

Referring again to FIG. 5, the software prompts 98 the user to designate sections of interest for measurements and reports, for example, certain points where measurements are to be performed or where specific images are to be produced. In one embodiment, the software provides explicit directions 100 and pre-defined labels 102. Examples of such points of interests include a beginning and an ending of a stenosis or aneurysm section, specific locations that pertain to the placement of endovascular prostheses or reference-healthy-sections. Some of these points can be placed by the user, while others can be located automatically. One or more measurements 104 are attached to these points in order to compute section area or diameters, length, tortuosity or volume of a part of a vessel 64. Wizard panel 74 also provides tools 106, 108, 110 to customize the set of points as well as the measurements that should be performed. Measurements that are automatically made by the software are: automatic measurements of: 3D lengths along the centerline between two locations; computation of a volume of the vascular section between two of these locations; determination of a local cross-section area, maximum and minimum diameter, and/or average diameter at a selected point. These measurements are derived from the identification of the centerline and the contours.

Figure 8:
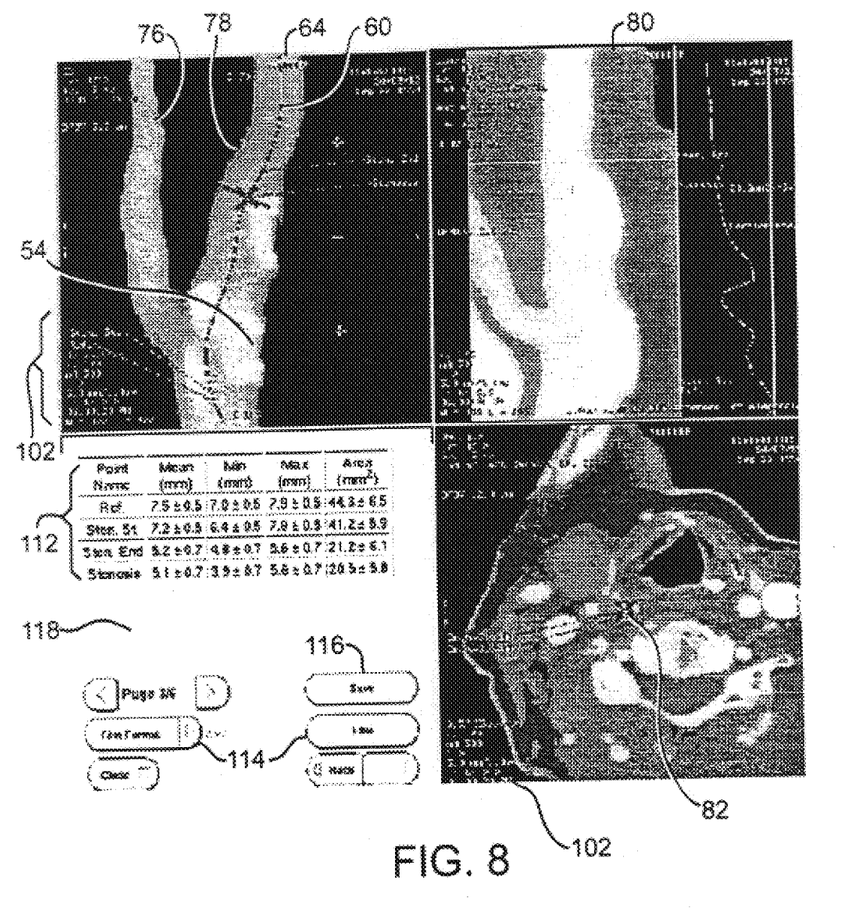
FIG. 8 is another drawing of a computer display for the selection of sections of interest for measurements and reports of one embodiment of the present invention, also showing a table of measurements.

In one embodiment and referring to FIG. 8, result tables 112 are provided to summarize measurements. In one embodiment, printing 114 and storing 116 capability is provided so that a user can either save or print the result tables with a set of significant vessel 64 images. Saving of measurements and selected images can be to a short- or long-term storage medium (including radiological film or paper hard copy) associated with computer 36. The software also provides a wizard panel 118 with tools and guidance to perform these actions. The user can select images to add to the report, if desired.

Figures 9, 10:
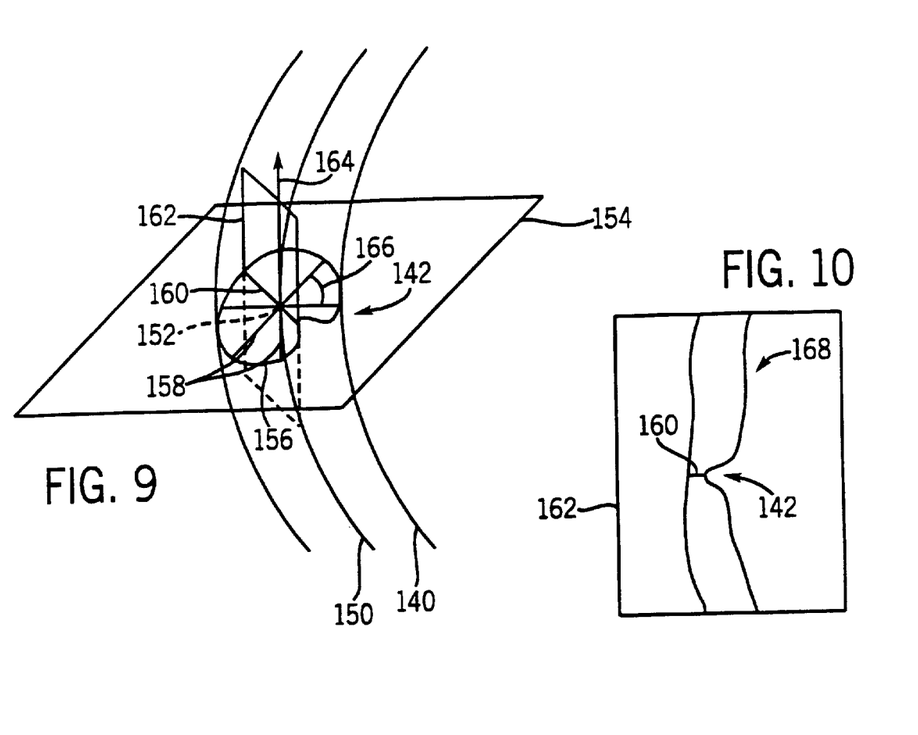
FIG. 9 is a schematic drawing illustrating a method of selecting a best plane for depicting a stenosis.
FIG. 10 is an exemplary image of the stenosis obtained by way of the method of FIG. 9.

Referring to FIG. 9, a method for showing a stenosis (e.g., the smallest cross-section) 142 of a vessel 140 is performed as follows. First, a centerline 150 is identified, and a particular local center point 152 on the centerline 150 is selected. The identification of the centerline 150 can be performed using the method described above or by identifying the structure locally and then determining its axes of inertia. Next, a cross-section plane 154 that is normal to the centerline 150 at the local center point 152 is obtained, and further a contour 156 of the vessel 140 within the cross-section plane is identified. Then, measurements are taken sequentially of the lengths of various segments 158 across the contour 156, where each of the segments passes through the local center point 152 and is effectively a diameter of the vessel 140 at the local center point. The measurements can be taken with respect to segments 158 that are spaced apart from one another by a select angle interval 166. From the measurements, a shortest segment 160 is identified.

Once the shortest segment 160 is identified, an imaging plane 162 showing the stenosis 142 can be determined. Specifically, the imaging plane 162 is the plane formed by the shortest segment 160 and a local axis 164 that is tangent to the centerline 150 at the local center point 152. As shown in FIG. 10, the imaging plane 162 can be displayed to show a cross-section 168 of the vessel 140 and reveal the stenosis 142. Further, any part of the volume defined by the imaging plane 162 (determined by the shortest segment 160 and the local axis 164 tangent to the local center point 152) and a specified distance to the imaging plane (not shown) can be displayed in a projection display manner, to cover thick reformatted slices. Also, using the perpendicular to the imaging plane 162 as a line of sight and the local center point 152 as a target, the imaging plane can be used to perform an x-ray acquisition. Additionally, using the coordinates of the imaging plane 162, a slice acquisition can be performed using a system such as an MR system. The location of the acquired slice can be that of the imaging plane 162 itself or another plane that is translated from the imaging plane by a selected distance.

Figures 11, 12:
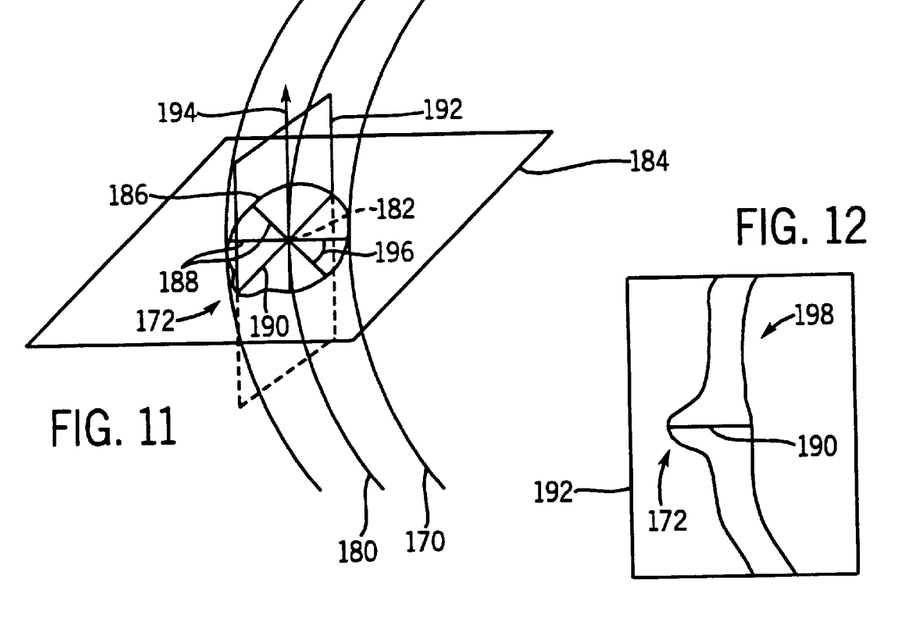
FIG. 11 is a schematic drawing illustrating a method of selecting a best plane for depicting an aneurysm.
FIG. 12 is an exemplary image of the aneurysm obtained by way of the method of FIG. 11.

Turning to FIG. 11, a method for showing an aneurysm (e.g., the largest cross-section) 172 of a vessel 170 is performed as follows. First, a centerline 180 is identified, and a particular local center point 182 on the centerline 180 is selected. The identification of the centerline 180 can be performed using the method described above or by identifying the structure locally and then determining its axes of inertia. Next, a cross-section plane 184 that is normal to the centerline 180 at the local center point 182 is obtained, and further a contour 186 of the vessel 170 within the cross-section plane is identified. Then, measurements are taken sequentially of the lengths of various segments 188 across the contour 186, where each of the segments passes through the local center point 182 and is effectively a diameter of the vessel 170 at the local center point. The measurements can be taken with respect to segments 188 that are spaced apart from one another by a select angle interval 196. From the measurements, a longest segment 190 is identified.

Once the longest segment 190 is identified, an imaging plane 192 showing the aneurysm 172 can be determined. Specifically, the imaging plane 192 is the plane formed by the longest segment 190 and a local axis 194 that is tangent to the centerline 170 at the local center point 172. As shown in FIG. 12, the imaging plane 192 can be displayed to show a cross-section 198 of the vessel 170 and reveal the aneurysm 172. Further, any part of the volume defined by the imaging plane 192 (determined by the longest segment 190 and the local axis 194 tangent to the local center point 172) and a specified distance to the imaging plane (not shown) can be displayed in a projection display manner, to cover thick reformatted slices. Also, using the perpendicular to the imaging plane 192 as a line of sight and the local center point 152 as a target, the imaging plane can be used to perform an x-ray acquisition. Additionally, using the coordinates of the imaging plane 192, a slice acquisition can be performed using a system such as an MR system. The location of the acquired slice can be that of the imaging plane 192 itself or another plane that is translated from the imaging plane by a selected distance.

In certain embodiments of the methods of FIGS. 9–12 additional steps are possible. For example, in one embodiment, multiple local center points such as center points 152 and 182 are iteratively selected. Additionally, in such embodiments or other embodiments, various information that is obtained can be stored in a storage device for long or short term storage and later retrieval. Such stored information can includes portions of or entire displayed imaging planes or volumes that are projection displayed, or acquired images.

Figure 13:
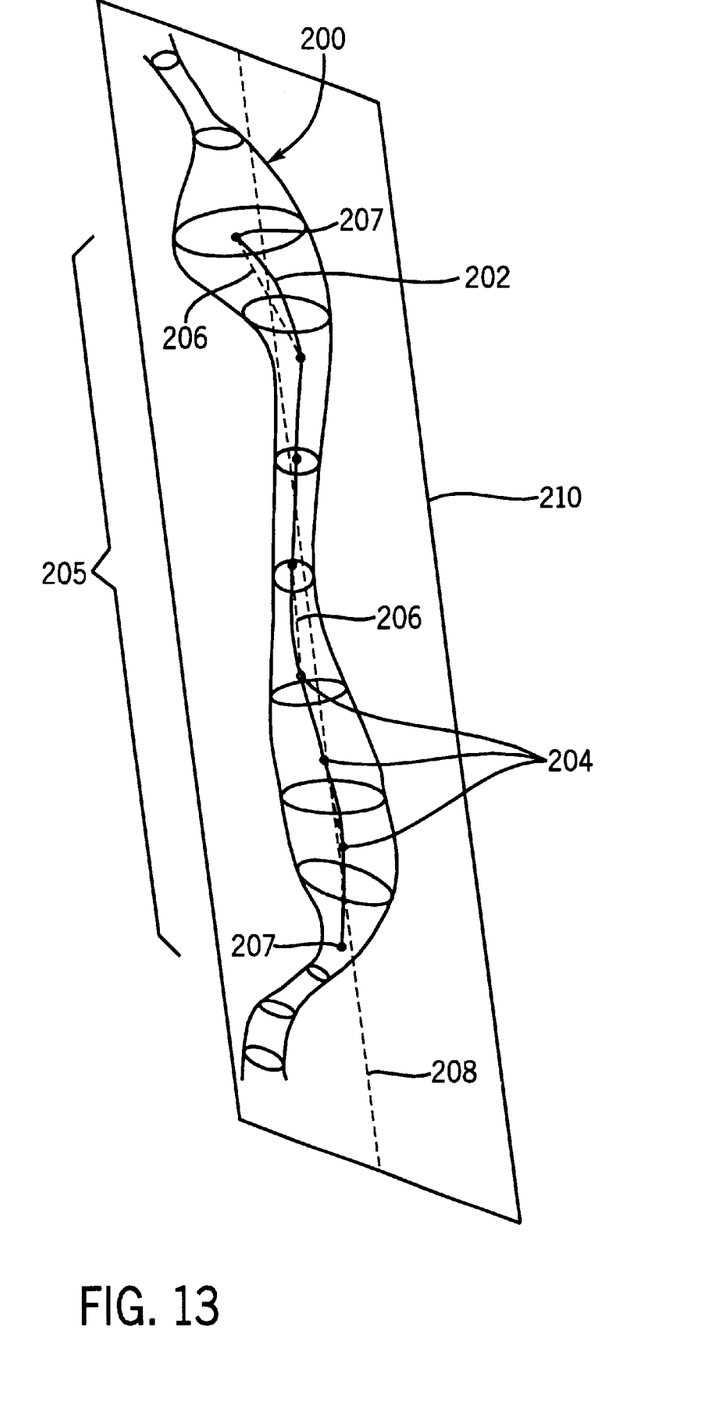
FIG. 13 is a schematic drawing illustrating a method of selecting a best plane for depicting the tortuosity of a vessel.

Referring to FIG. 13, a method for showing the tortuosity of a vessel 200 is performed as follows. First, a centerline 202 of the vessel 200 is identified, and then points 204 on the centerline are selected over a certain section 205 of the centerline. The identification of the centerline 200 can be performed using the method described above or by identifying the structure locally and then determining its axes of inertia. Typically, three or more points 204 are selected, and the points can, but need not, be selected at equidistant locations along the centerline 200. The points 204 define a polygon 206, and two end points 207 of the set of points 204 bound the section 205.

Next, using a known least square distance method, an imaging plane 210 is determined that minimizes the distances to the points 204. More specifically, the plane that minimizes the sum of the squares of the distances of the points to the plane measured perpendicularly to the plane is determined. In alternate embodiments, other methods of determining an imaging plane that is most closely aligned with the selected points 204 can be employed in place of the least square distance method. An axis 208 of the imaging plane 210 is shown in FIG. 13 to illustrate the relative alignment of the imaging plane with the selected points 204.

Figure 14:
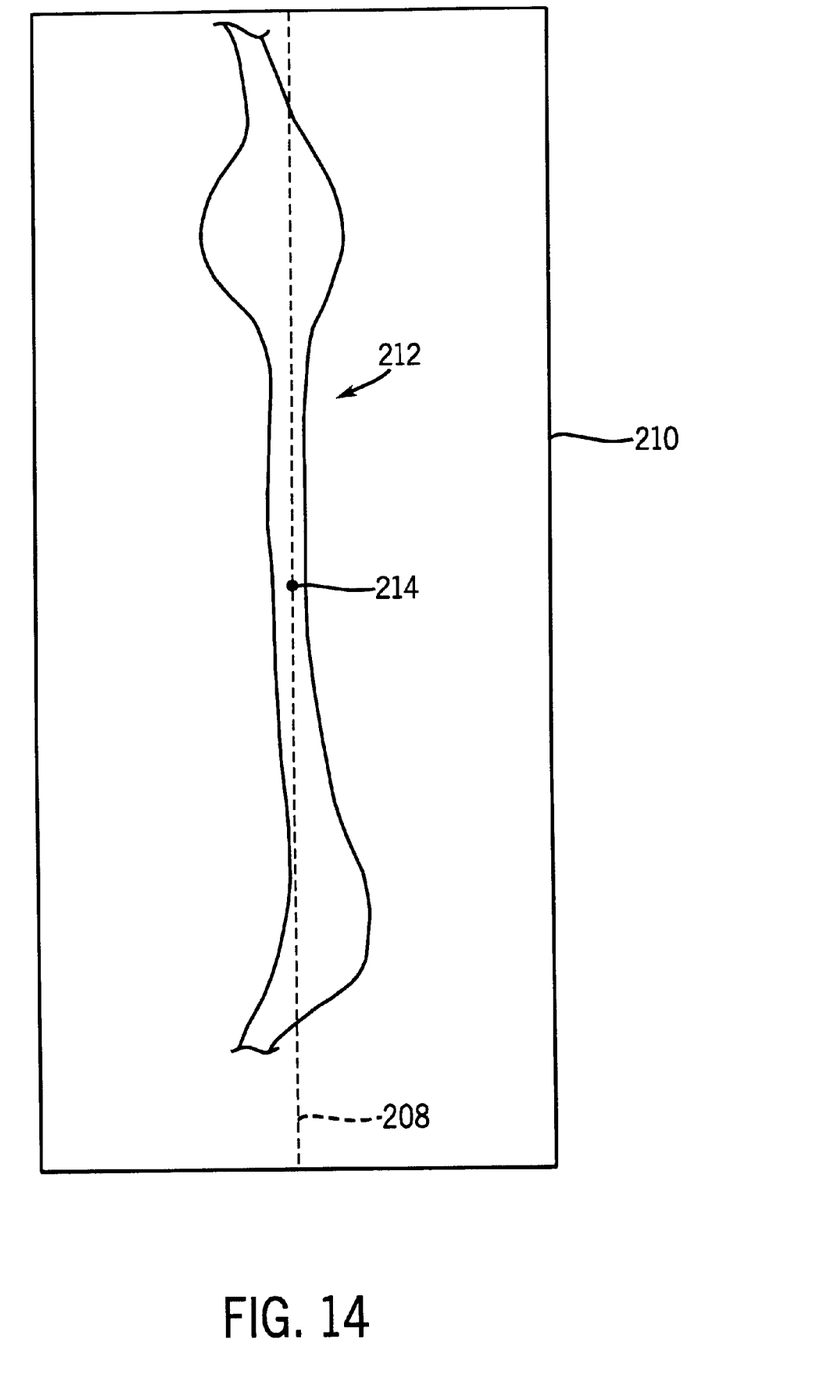
FIG. 14 is an exemplary image of the vessel of FIG. 13 showing the tortuosity of the vessel.

Upon determination of the imaging plane 210, the imaging plane can be displayed to show a cross-section 212 of the vessel 200 as shown in FIG. 14, such that the tortuosity of the vessel is revealed. Further, any part of the volume defined by the imaging plane 210 and a specified distance to the imaging plane (not shown) can be displayed in a projection display manner, to cover thick reformatted slices. For example, a box-like volume can be projection displayed, where one of the surfaces of the box-like volume is formed from the imaging plane 210, and the opposite surface of the box-like volume is a specified distance from the imaging plane. Also, using the perpendicular to the imaging plane 210 as a line of sight and a center point 214 of the imaging plane (typically along the axis 208) as a target, an image acquisition can be performed using an x-ray system or similar imaging system. Depending upon the embodiment, the center point 214 can be but need not be, located on the centerline 202.

Additionally, using the coordinates of the imaging plane, a slice acquisition can be performed using an MR system or similar imaging system, where the acquired slice is at the coordinates of the imaging plane 210 or at coordinates that are a selected translation in relation to the imaging plane. Further, in certain embodiments, different sections defined by different sets of points along the centerline 202 can be iteratively selected. In such embodiments, multiple images can be displayed or acquired. Additionally, in certain embodiments, the various image information can be stored in storage devices for later retrieval. Also, displayed or acquired image information (or stored image information) can be printed using conventional printing devices.

It should be understood that the methods and apparatuses described above are only exemplary and do not limit the scope of the invention, and that various modifications could be made by those skilled in the art that would fall under the scope of the invention.

What is claimed is:

1. A method of displaying a structure of a vessel, the method comprising:
   identifying a centerline of the vessel within at least a portion of the vessel that includes the structure;
   identifying a contour of the vessel within a cross-sectional plane that is normal to a selected point along the centerline;
   measuring lengths of a plurality of segments that pass across the contour through the selected point;
   selecting one of the plurality of segments; and
   at least one of
      displaying at least a part of an imaging plane defined by the selected one segment and an axis that is tangent to the centerline at the point, wherein the imaging plane shows the structure of the vessel, and
      performing an image acquisition in relation to the imaging plane.

2. The method of claim 1, wherein the performing of the image acquisition includes performing at least one of an x-ray acquisition using a perpendicular to the imaging plane as a line of sight and the selected point as a target, and an MR acquisition.

3. The method of claim 2, wherein the performing of the MR acquisition includes performing a slice acquisition wherein a slice location is included in at least one of the imaging plane and another plane that is translated from the imaging plane.

4. The method of claim 1, wherein the structure is one of a stenosis and an aneurysm, and the vessel is at least one of a blood vessel, a lymph vessel, an airway and a duct.

5. The method of claim 4 wherein, when the structure is a stenosis, the selected one segment is a shortest segment of the plurality of segments and, when the structure is an aneurysm, the selected one segment is a longest segment of the plurality of segments.

6. The method of claim 1, wherein the centerline is identified by at least one of calculating the centerline from a plurality of centerline points specified by a user, and identifying the portion of the vessel and then determining its axes of inertia.

7. The method of claim 1, wherein the centerline is identified by at least one of an automated method and a manual method, and wherein the plurality of segments vary from one another in their position by a selected angle.

8. The method of claim 1, further comprising iteratively selecting the selected point, and repeatedly displaying imaging planes associated with the respective iteratively selected points.

9. The method of claim 1, further comprising one of: saving at least a portion of one of the displayed imaging plane and the acquired image in a storage device; and printing at least a portion of one of the displayed imaging plane and the acquired image by way of a printing device.

10. The method of claim 1, wherein the displaying of the at least one part of the imaging plane is the projection displaying of any part of a volume defined by the imaging plane a specified distance to the imaging plane.

11. An apparatus for displaying a portion of a tubular vessel, the apparatus comprising:

means for selecting at least one point along a centerline of the vessel proximate the portion;

means for identifying an imaging plane based upon the selected at least one point; and at least one of means for displaying at least a part of the imaging plane, and means for acquiring an image in relation to the imaging plane;

wherein at least one of:

the selected at least one point includes a single point, and the means for identifying the imaging plane determines a local axis of the centerline that is tangent to the centerline at the single point, determines a cross-sectional plane that is perpendicular to the centerline at the single point, determines a contour of the vessel in the cross-sectional plane, determines a diameter segment passing across the contour and through the single point that best exhibits a particular characteristic, and identifies the imaging plane as a plane defined by the local axis and the diameter segment; and the selected at least one point includes a plurality of points, and the means for identifying the imaging plane determines the imaging plane as the plane that most closely depicts a selected section determined by the plurality of points.

12. The apparatus of claim 11, wherein the means for displaying is capable of displaying one of a portion of the imaging plane and a portion of a volume defined by the imaging plane and a specified distance perpendicular to the imaging plane, wherein when the portion of the volume is displayed, it is displayed in a projection display format; and wherein the means for acquiring is capable of performing one of an x-ray acquisition using a perpendicular to the imaging plane as a line of sight, and a slice acquisition using an MR system, wherein a slice location for the slice acquisition is included in at least one of the imaging plane and another plane that is translated from the imaging plane.

13. A method of displaying a structure of a vessel, the method comprising:

determining a centerline of a tubular structure;

selecting a section of the centerline;

determining a plane that minimizes a quantity that is functionally related to distances to the selected section; and at least one of displaying at least a part of the plane, and performing an image acquisition in relation to the plane.

14. The method of claim 13, wherein the displaying of the part of the plane is projection displaying of a volume defined by a surface, wherein a portion of the surface is a specified distance from the plane.

15. The method of claim 14, further comprising saving at least a portion of one of the displayed imaging plane, the volume, and an acquired image in a storage device, and then repeating the selecting of a section, determining of a plane, and at least one of displaying and performing with respect to an additional section of the centerline.

16. The method of claim 13, wherein the selecting of the section includes selecting a plurality of points along the centerline, wherein the plurality of points define a polygon and the section is defined as the segment of the centerline between a pair of endpoints of the plurality of points.

17. The method of claim 16, wherein a least square distance method is employed to determine the plane that minimizes the distance to the selected section by determining the plane that minimizes the distances to the plurality of points.

18. The method of claim 13, wherein at least one of an automated method and a manual method is employed to determine the centerline, and further comprising iteratively selecting center points of the section.

19. The method of claim 13, wherein the performing of the image acquisition includes at least one of performing an x-ray acquisition using a perpendicular to the plane as a line of sight and using a middle point of the selected section as a target; and performing a slice acquisition using an MR system, wherein a slice location is included in at least one of the plane and another plane that is translated from the plane.

* * * * *